(12) United States Patent
Meyer

(10) Patent No.: US 6,701,895 B1
(45) Date of Patent: Mar. 9, 2004

(54) CYLINDER EVENT BASED SPARK

(75) Inventor: Garth Michael Meyer, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/374,186

(22) Filed: Feb. 26, 2003

(51) Int. Cl.[7] ............................................. F02P 5/145
(52) U.S. Cl. ............................ 123/406.53; 123/406.52; 123/406.55; 60/285
(58) Field of Search ................... 123/406.52, 406.53, 123/406.55, 406.49, 406.47; 60/285

(56) References Cited

U.S. PATENT DOCUMENTS

| | | | |
|---|---|---|---|
| 4,052,967 A | * 10/1977 | Colling et al. | 123/406.53 |
| 4,310,888 A | * 1/1982 | Furuhashi et al. | 123/406.53 |
| 4,432,325 A | 2/1984 | Auracher et al. | |
| 4,442,812 A | * 4/1984 | Mizuno et al. | 123/406.47 |
| 4,489,691 A | * 12/1984 | Ono et al. | 123/406.53 |
| 4,592,324 A | * 6/1986 | Nakano et al. | 123/406.53 |
| 4,653,452 A | 3/1987 | Sawada et al. | |
| 4,951,499 A | 8/1990 | Akimoto | |
| 5,016,590 A | * 5/1991 | Ohkumo | 123/406.49 |
| 5,159,914 A | 11/1992 | Follmer et al. | |
| 5,483,946 A | 1/1996 | Hamburg et al. | |
| 5,497,329 A | 3/1996 | Tang | |
| 5,537,977 A | 7/1996 | Hartman et al. | |
| 5,654,501 A | 8/1997 | Grizzle et al. | |
| 5,755,212 A | 5/1998 | Ajima | |
| 5,870,986 A | 2/1999 | Ichinose | |
| 5,893,349 A | 4/1999 | Rado | |
| 5,983,868 A | 11/1999 | Ichinose | |
| RE36,737 E | 6/2000 | Brehob et al. | |
| 6,089,082 A | 7/2000 | Kotwicki et al. | |
| 6,135,087 A | 10/2000 | DeGeorge et al. | |
| 6,155,242 A | 12/2000 | Kotwicki et al. | |
| 6,170,475 B1 | 1/2001 | Lewis et al. | |
| 6,282,485 B1 | 8/2001 | Kotwicki et al. | |
| 6,360,531 B1 | 3/2002 | Wiemero et al. | |
| 6,598,588 B2 * | 7/2003 | Yuya | 123/406.55 |

OTHER PUBLICATIONS

SAE 810494, "Transient A/F Control Characteristics of the 5 Liter Central Fuel Injection Engine", C.F. Aquino.

* cited by examiner

Primary Examiner—Erick Solis
(74) Attorney, Agent, or Firm—Allan J. Lippa; Kolisch Hartwell, P.C.

(57) ABSTRACT

A method to deliver spark during a start for an internal combustion engine is described. The method provides individual cylinder spark angle control based on the number of fueled cylinder events. The method offers improved engine emissions while maintaining engine speed run-up performance.

19 Claims, 8 Drawing Sheets

CYLINDER EVENT BASED SPARK

FIELD OF INVENTION

The present invention relates to a method for controlling an internal combustion engine and more particularly to a method for adjusting spark based on the number of fueled cylinders during a start.

BACKGROUND OF THE INVENTION

Engine starting control has a significant impact on engine emissions and engine speed run-up. Spark placement, relative to piston position, influences both torque and emissions. Torque is necessary to accelerate an engine from cranking speed up to idle speed. Further, low starting emissions are desirable when catalysts are cold and their efficiency is low. In general, advancing spark increases engine torque while retarding spark reduces emissions. Therefore, it is important to provide consistent well-placed spark timing to ensure engine speed run-up with reduced emissions.

One method to adjust spark while an engine is cold is described in U.S. Pat. No. 6,135,087. This method provides spark advance based on coolant temperature and engine speed. Further, the amount of spark advance accounts for engine position and time from the start-to-run transfer. More particularly, the method initially determines whether the desired spark advance is before top dead center and whether the throttle is open. If so, the method uses engine speed and coolant temperature to determine a spark advance multiplier. Thereafter, the current engine position pulse is loaded and an engine position multiplier is interpolated and applied to the spark advance multiplier value. Next, the time since the start-to-run is loaded and a start-to-run multiplier is interpolated and applied to the spark advance multiplier value. Finally, the spark is advanced via the spark advance multiplier value as adjusted by the engine position pulse multiplier and the time since start-to-run transfer multiplier. Upon engine operation reaching an after top dead center condition or when the throttle is closed, the method is exited and the engine is returned to normal spark control.

The inventors herein have recognized several disadvantages of this approach. Namely, the approach changes spark advance based on engine position, thereby resulting in inconsistent spark placement during the engine start. In other words, when an engine is turned off, it generally stops at a random position. In general, key-off removes power from the engine controller and sensors so that engine position data is lost. Consequently, the engine controller monitors several signals during a start to reestablish engine position. Thus, engine position is changing while the engine controller monitors cam and crank signals, attempting to determine engine position. The number of cylinder events before engine position can be established will vary from start to start depending on where the engine has stopped and on the complexity of the engine position monitoring system.

Therefore, if spark based on position is delivered without regard to synchronization between the engine controller and the engine, or without regard to fuel delivery, the angle at which spark is delivered may vary from start to start.

As an example, a fueled cylinder receiving spark may receive spark at an angle intended for the next or prior fueled cylinder. As such, engine position based spark as presented in the prior art, may deliver less than optimal spark.

Furthermore, the method functions only when base spark advance is after top dead center (ATDC) and if the throttle is open. Therefore, the above-mentioned approach does not optimally deliver spark during start where the throttle is closed and retarded spark is used to lower emissions.

Another method to adjust spark when and engine is cold is described in U.S. Pat. No. 5,483,946 owned by the assignee of the present invention. The method describes retarding ignition timing from a nominal value during a period following engine start and returning the ignition timing to the nominal value by termination of the period, where the period is based on time.

The inventors herein have also recognized that while this approach works well during cold engine operation, it can be inaccurate during start because the method adjusts spark in relation to time. Spark based on time delivers a spark advance that is a function of time since the timer is started. However, there is not a one to one relationship between engine position and time due to variability in engine stopping location as discussed above. Further, engine position is a mechanical dimension; time is a continuum, which lacks spatial dimensions.

SUMMARY OF THE INVENTION

One embodiment of the present invention includes a method that improves spark placement and consistency during start is presented. The method comprises: counting a number of cylinders receiving at least one fuel injection from a start of an internal combustion engine; and calculating cylinder spark advance based on said counted number of cylinders. This method can be used to reduce the above-mentioned limitations of the prior art approaches.

By counting the number of cylinders that have received fuel, and delivering spark based on the cylinder count, the inventors herein have improved engine starting. Independent of engine stopping location, the first fueled cylinder and subsequent cylinders will receive consistent-spark, start after start. For this reason, the engine controller can deliver fuel immediately or delayed and still maintain combustion consistency during a start. This can be used to produce low emissions and uniform engine speed run-up.

Further, another advantage of the present invention, derived from counting fueled cylinders, is that a better match between cylinder mixture and spark advance is possible. The inventors herein have recognized that during a start, changes occur within an engine and its surroundings. The first few fired cylinders have an air-fuel mixture that is composed of fresh charge and fuel. In other words, there is very little EGR or residuals during the first few combustion events. After the first few cylinders fire and expel their residuals, the residuals affect air-fuel mixtures in other cylinders. Therefore, the combustion process in an engine is not linked to time, but to the number of cylinders receiving fuel.

Furthermore, since the cylinders receiving fuel have distinct air-fuel-residual mixtures, it is desirable to provide spark suited to these mixtures. Spark delivery based on the number of fueled cylinder events allows the engine controller to deliver unique spark angles to individual cylinders. This allows the engine controller to account for individual cylinder air-fuel mixture differences.

In addition, fuel composition also affects mixture preparation and may influence engine speed run-up. Fuels containing alcohol provides less energy affecting torque and engine speed. If spark is delivered based on engine speed and load, the controller may alter the spark in an undesirable manner. Therefore, spark delivery that solely or additionally takes into account the counted number of fueled cylinders can be used to improve spark placement consistency with regard to engine control and combustion mixtures.

The present invention provides a number of advantages. The present invention provides the advantage of improved spark control during engine starting, resulting in lower emissions. This advantage is especially beneficial when a catalyst is cold and its efficiency is low. In addition, the present invention improves engine speed run-up consistency. Repeatable engine speed during starting improves owner confidence and satisfaction since the engine behaves in a reliable and predictable manor.

The above advantages and other advantages and features of the present invention will be readily apparent from the following detailed description of the preferred embodiments when taken in connection with the accompanying drawings.

BRIEF DESCRIPTION OF THE DRAWINGS

The advantages described herein will be more fully understood by reading an example of an embodiment in which the invention is used to advantage, referred to herein as the Description of Invention, with reference to the drawings, wherein.

DESCRIPTION OF INVENTION

Figure 1:
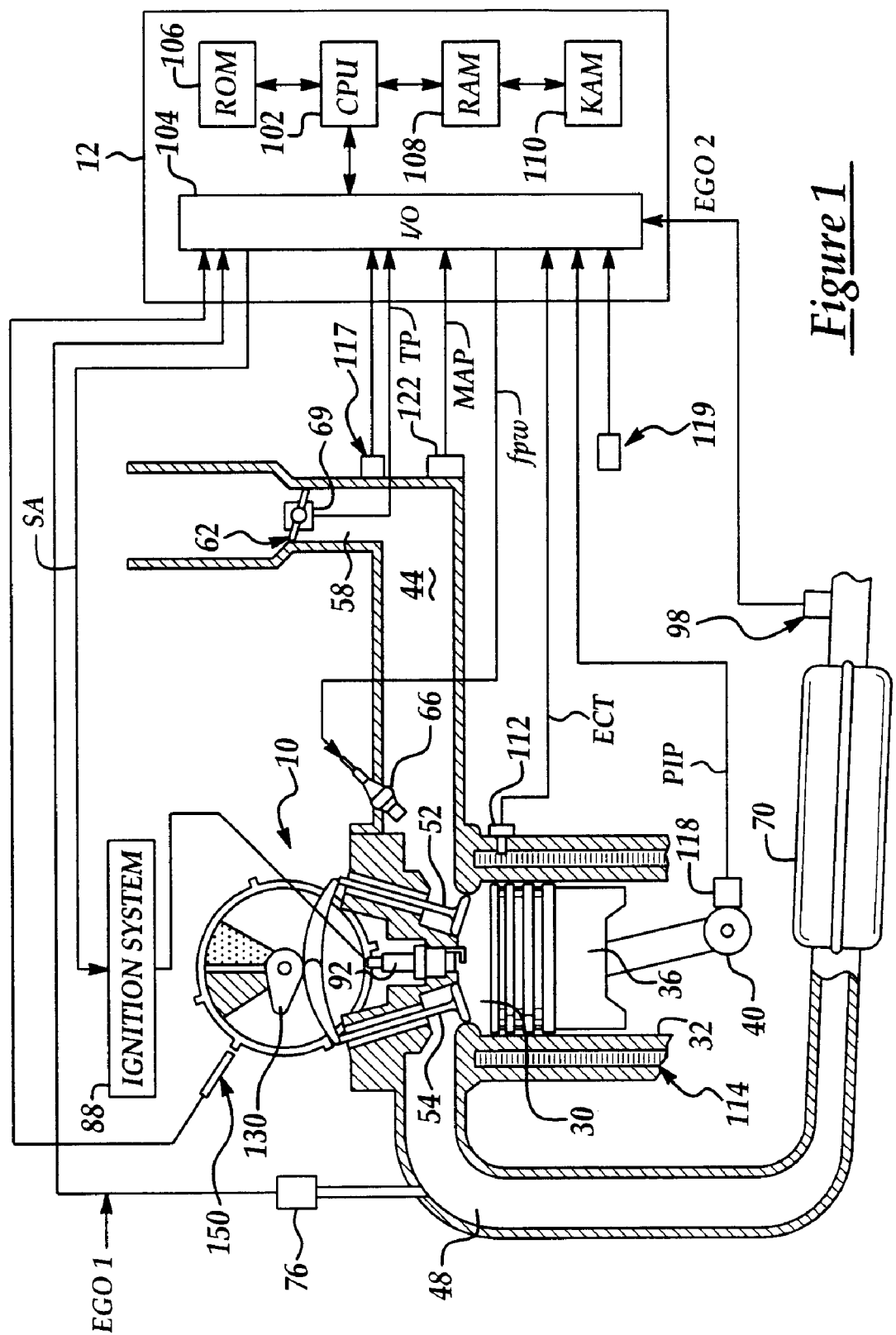
FIG. 1 is a schematic diagram of an engine wherein the invention is used to advantage.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with camshaft 130 and piston 36 positioned therein and connected to crankshaft 40. Combustion chamber 30 is known communicating with intake manifold 44 and exhaust manifold 48 via respective intake valve 52 an exhaust valve 54. Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the combustion chamber, which is known to those skilled in the art as direct injection. Intake manifold 44 is shown communicating with throttle body 58 via throttle plate 62.

Conventional distributorless ignition system 88 provides ignition spark to combustion chamber 30 via spark plug 92 in response to controller 12. Two-state exhaust gas oxygen sensor 76 is shown coupled to exhaust manifold 48 upstream of catalytic converter 70. Two-state exhaust gas oxygen sensor 98 is shown coupled to exhaust manifold 48 downstream of catalytic converter 70. Sensor 76 provides signal EGO1 to controller 12. Alternatively, a Universal Exhaust Gas Oxygen sensor may be used for sensor 98.

Controller 12 is shown in FIG. 1 as a conventional microcomputer including: microprocessor unit 102, input/output ports 104, and read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold absolute pressure (MAP) form pressure sensor 122 coupled to intake manifold 44; a measurement (ACT) of engine air amount temperature or manifold temperature from temperature sensor 117; a cam position signal (CAM) from cam sensor 150; and a profile ignition pickup signal (PIP) from a Hall effect sensor 118 coupled to a crankshaft 40, and an engine speed signal (RPM) from engine speed sensor 119. In a preferred aspect of the present invention, engine speed sensor 119 produces a predetermined number of equally spaced pulses every revolution of the crankshaft.

Figure 2:
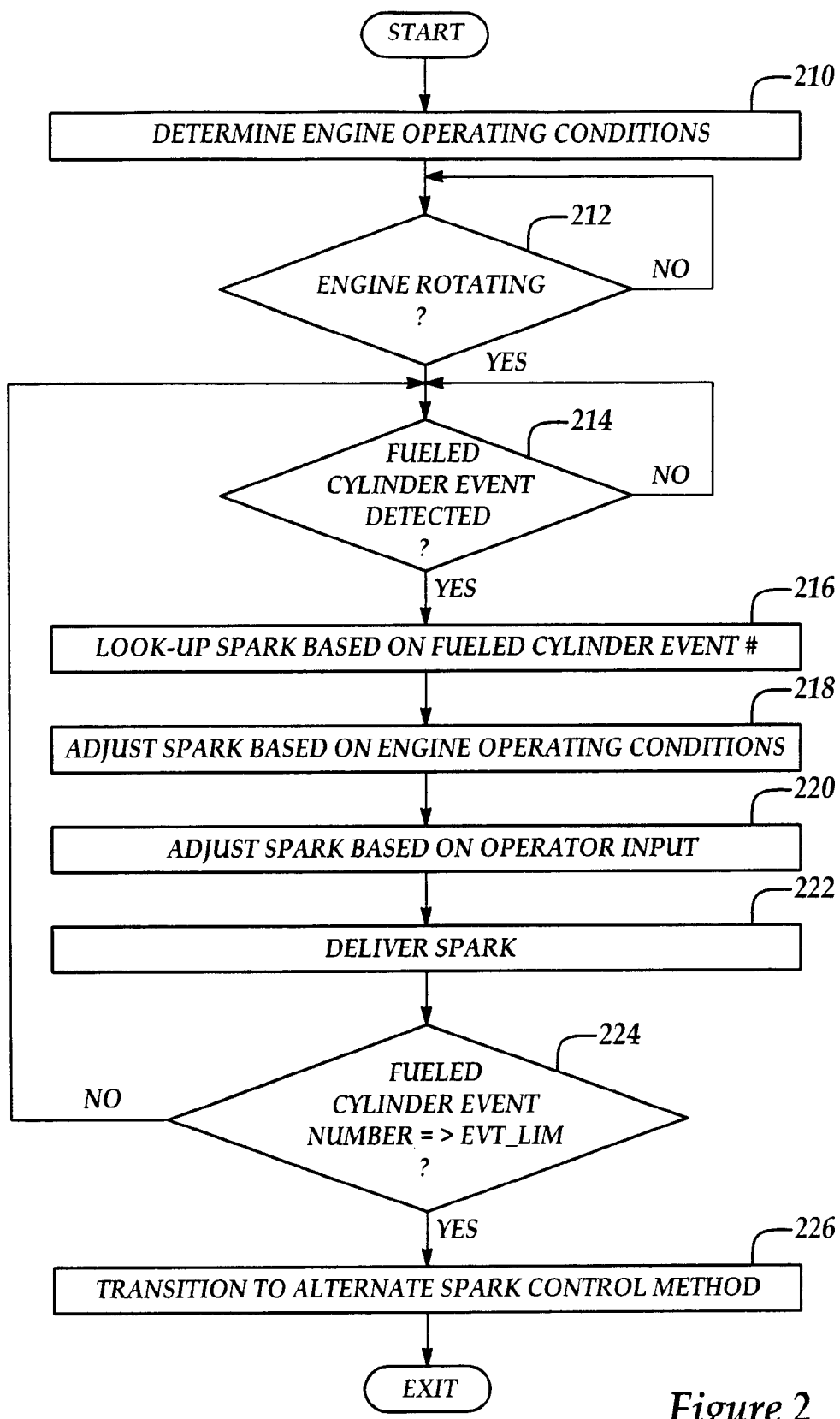
FIG. 2 is a high level flow chart describing fueled cylinder event based spark during a start.

Referring to FIG. 2, a flowchart of a routine performed by controller 12 when spark based on the number of fueled cylinder events is desired. The period of the cylinder event signal in degrees is: 720/number of engine cylinders. The cylinder event signal identifies when a given engine cylinder reaches top-dead-center of compression stroke.

In step 210, engine operating conditions are read. Operating conditions are determined by measuring engine coolant temperature, engine air temperature, barometric pressure, catalyst temperature, time since engine last operated (soak time), and parameters alike. These parameters are used to compensate the engine spark angle request in steps 216 and 218. The parameters influence engine operation in different ways depending on their state. For example, lower catalyst temperatures produce spark angle retard, but higher catalyst temperatures advance spark angle.

In step 212, the routine decides to proceed based on whether the engine is rotating. If the engine is not rotating, the routine waits until the crank position sensor 118 detects engine rotation. If the engine is rotating, the routine proceeds to step 214. In step 214, the controller determines if a fueled cylinder event has occurred. If so, the fueled cylinder event counter is incremented and the routine proceeds to step 216. If no newly fueled cylinders have occurred, the routine waits until a fueled cylinder event is observed.

Figure 8:
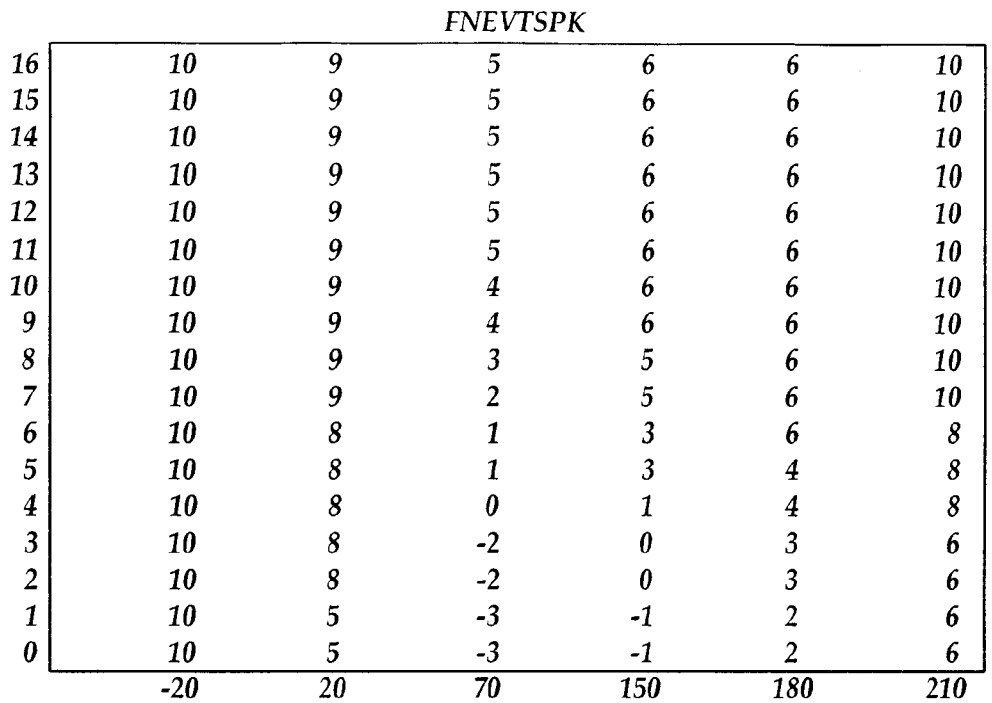
FIG. 8 is a table of example spark delivered during a start.

In step 216, the desired spark request is looked up from the table in FIG. 8, FNESPK. The spark values in the table will depend on how the engine is being controlled. Some applications will prefer a lean cylinder air-fuel mixture promoting port oxidation, while other applications will prefer a rich air-fuel mixture with air injected into the exhaust manifold. Because the in-cylinder mixtures are different, their spark requirements are also different, prompting differences in the FNESPK table based on the application. FIG. 8 is an example of spark demand for lean in cylinder air-fuel mixtures.

After the desired spark is determined, the routine advances to step 218. In step 218, the spark may be modified depending on engine operating conditions observed in step 210. Compensation for barometric pressure is stored in a function named FNBP. Depending on where nominal barometric pressure is defined in the function, spark is advanced or retarded from that point to achieve desired emissions and engine speed run-up. The function has x dimensions of inches of Mercury and y dimensions of change (Δ) in spark, with units of angular degrees. Positive values in the function advance spark while negative values retard spark.

Compensation for air charge temperature is stored in a function named FNACT. Depending on where nominal air charge temperature is defined in the function, spark is advanced or retarded from that point to achieve desired emissions and engine speed run-up. The function has x dimensions of air charge temperature in degrees Fahrenheit and y dimensions of change (Δ) in spark, with units of angular degrees.

Compensation is also provided for catalyst temperature by function FNCAT. In general, FNCAT is calibrated to retard spark angle at lower catalyst temperatures and advances spark angle at higher catalyst temperatures. Catalyst temperature may be measured or inferred. The function has x dimensions of degrees Fahrenheit and y dimensions of change (Δ) in spark, with units of angular degrees.

Compensation for time since last engine operation, soak time, is captured in function FNST. In general, FNST is calibrated to retard spark as soak time increases and advance spark as soak time increases. The function has x dimensions of soak time in seconds and y dimensions of change (Δ) in spark, with units of angular degrees.

All sources of spark compensation are combined into a single change in spark demand that is used to modify the spark angle from step 216. The routine then proceeds to step 220 where compensation for operator input is provided. Operator input may take a number of forms including but not limited to: changing throttle position, load request via electronic throttle or electronically controlled valves, torque request, air conditioning, or any device or system that increases load on the engine. In this example, operator input is throttle position. If the operator inputs a demand to the throttle, the throttle signal is processed through the function FNTHROTTLE. The function has x dimensions of throttle position with units of volts and y dimensions of change (Δ) in spark, with units of angular degrees. The function is calibrated to advance spark as the throttle input increases, other inputs would follow the same form, increasing user demand advances spark. If the operator input is substantially zero, or less than a predetermined amount (e.g., 1–10%, or less than 5%, of total displacement), the function provides no compensation for the operator input. The routine proceeds to step 222 where the desired spark angle is delivered to the engine.

The routine then proceeds to step 224 where the decision is made to continue delivering spark based on the number of fueled cylinder events or exit to another method of spark control, e.g., independent of the number of fueled cylinder events. If the current number of fueled cylinder events is not less than the calibration parameter EVT_LIM, then the routine proceeds to step 214. If the number of fueled cylinder events is greater than or equal to EVT_LIM, the routine proceeds to step 226. In step 226, a transition is made from fueled cylinder event based spark to another method of spark control. For example, time based spark control, where a timer is started after the last fueled cylinder event based spark is delivered and then spark is delivered as a function of time.

Alternatively, the routine may be designed to transition to speed/load based spark. However, care should be exercised in the transition since spark based on engine speed/load can be influenced by barometric pressure during starting because there is less oxygen at altitude than when at sea level. Once the transition to the alternate spark control method is complete, the routine is exited.

Figure 3:
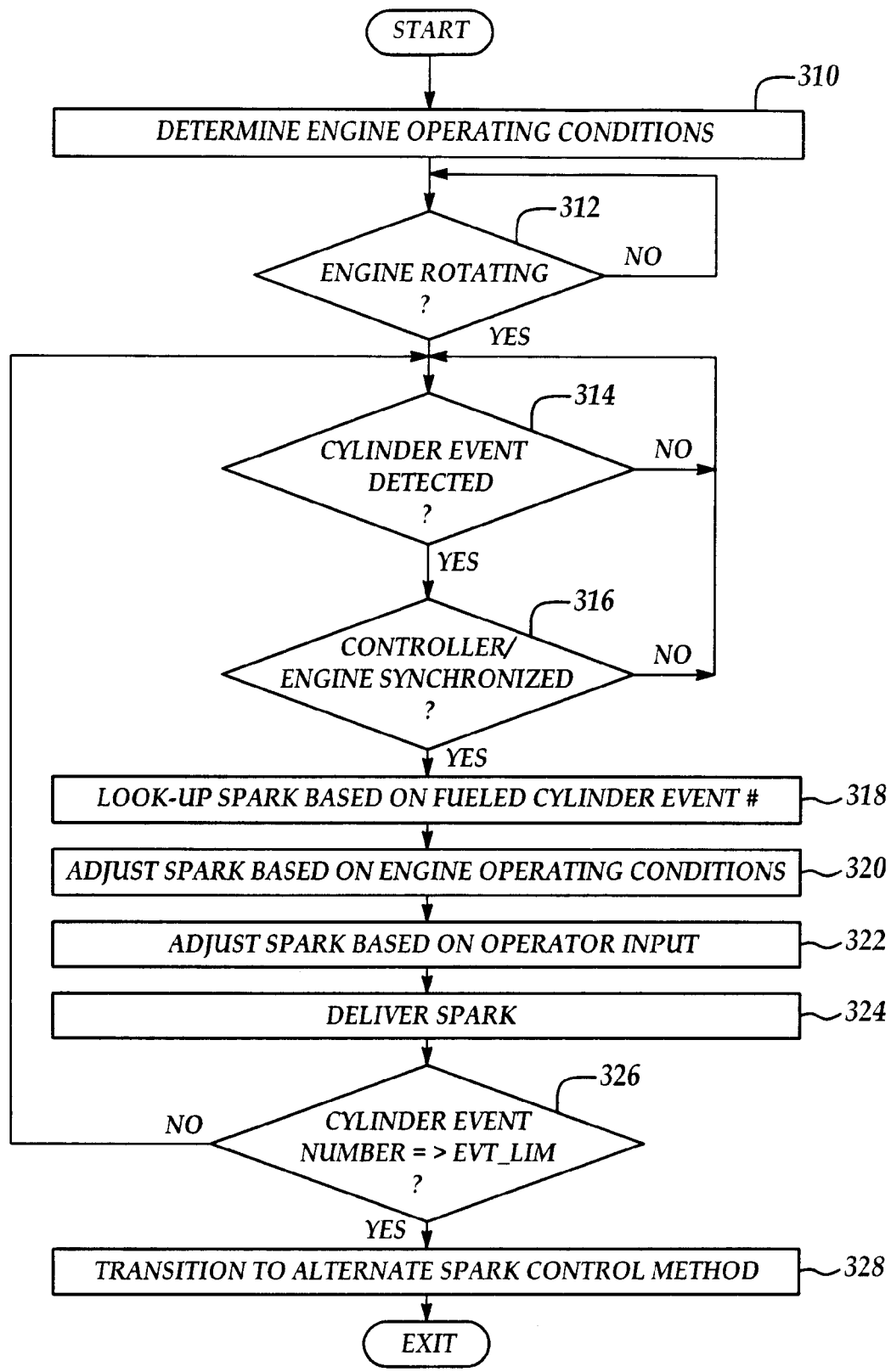
FIG. 3 is a high level flow chart describing synchronized cylinder event based spark during a start.

Referring to FIG. 3, a flowchart of a routine performed by controller 12 when spark based on the number of synchronized cylinder events is desired. Synchronization occurs when engine timing is aligned with engine controller operation. In step 310, engine operating conditions are read. Operating conditions are determined by measuring engine coolant temperature, engine air temperature, barometric pressure, catalyst temperature, time since engine last operated (soak time), and parameters alike. These parameters are used to compensate the engine spark angle request in steps 318 and 320. The parameters influence engine operation in different ways depending on their state. For example, lower catalyst temperatures produce spark angle retard, but higher catalyst temperatures advance spark angle.

In step 312, the routine decides to proceed based on whether the engine is rotating. If the engine is not rotating, the routine waits until the crank position sensor 118 detects engine rotation. If the engine is rotating, the routine proceeds to step 314. In step 314, the controller determines if a synchronized cylinder event has occurred, if so, the synchronized cylinder event counter increments and the routine continues on to step 316. If no new synchronized cylinder events have occurred, the routine waits until a synchronized cylinder event is observed.

Engine and controller synchronization is determined in step 316. If the controller observes cam and crank signals that allow determination of engine position, the engine controller aligns operations to engine timing, becoming synchronized. Upon synchronization the event counter is set to zero and the routine continues to step 318. If the engine and the controller are already synchronized, the routine again proceeds to step 318. If synchronization is not established and if synchronization cannot be established, the routine returns to step 314.

In step 318, the desired spark request is looked-up from the table similar to the table in FIG. 8, FNESPK. However, spark values used by step 318 are based on cylinder events after synchronization instead of fueled cylinder events as is described by FIG. 8. The spark values in the table will depend on how the engine is being controlled. Some applications will prefer a lean cylinder air-fuel mixture promoting port oxidation, while other applications will prefer a rich air-fuel mixture with air injected into the exhaust manifold. Because the in-cylinder mixtures are different, their spark requirements are also different, prompting differences in the FNESPK table based on the application.

After the desired spark is determined, the routine advances to step 320. In step 320, the spark may be modified depending on engine operating conditions observed in step 310. Compensation for barometric pressure is stored in a function named FNBP. Depending on where nominal barometric pressure is defined in the function, spark is advanced or retarded from that point to achieve desired emissions and engine speed run-up. The function has x dimensions of inches of Mercury and y dimensions of change (Δ) in spark, with units of angular degrees. Positive values in the function advance spark while negative values retard spark.

Compensation for air charge temperature is stored in a function named FNACT. Depending on where nominal air charge temperature is defined in the function, spark is advanced or retarded from that point to achieve desired emissions and engine speed run-up. The function has x dimensions of air charge temperature in degrees Fahrenheit and y dimensions of change (Δ) in spark, with units of angular degrees.

Compensation is also provided for catalyst temperature by function FNCAT. In general, FNCAT is calibrated to retard spark angle at lower catalyst temperatures and advances spark angle at higher catalyst temperatures. Catalyst temperature may be measured or inferred. The function has x dimensions of degrees Fahrenheit and y dimensions of change (Δ) in spark, with units of angular degrees.

Compensation for time since last engine operation, soak time, is captured in function FNST. In general, FNST is calibrated to retard spark as soak time increases and advance spark as soak time increases. The function has x dimensions of soak time in seconds and y dimensions of change (Δ) in spark, with units of angular degrees.

All sources of spark compensation are combined into a single change in spark demand that is used to modify the spark angle from step 318. The routine then proceeds to step 322 where compensation for operator input is provided. Operator input may take a number of forms including but not limited to: changing throttle position, load request via electronic throttle or electronically controlled valves, torque request, air conditioning, or any device or system that increases load on the engine. In this example, operator input is throttle position. If the operator inputs a demand to the throttle, the throttle signal is processed through the function FNTHROTTLE. The function has x dimensions of throttle position with units of volts and y dimensions of change (Δ) in spark, with units of angular degrees. The function is calibrated to advance spark as the throttle input increases, other inputs would follow the same form, increasing user demand advances spark. If the operator input is substantially zero, or less than a predetermined amount (e.g., 1–10%, or less than 5%, of total displacement), the function provides no compensation for the operator input. The routine proceeds to step 324 where the desired spark angle is delivered to the engine.

The routine then proceeds to step 326 where the decision is made to continue delivering spark based on the number of synchronized cylinder events or exit to another method of spark control, e.g., independent of the number of synchronized cylinder events. If the current number of synchronized cylinder events is not less than the calibration parameter EVT_LIM, then the routine proceeds to step 314. If the number of synchronized cylinder events is greater than or equal to EVT_LIM, the routine proceeds to step 328. In step 328, a transition is made from synchronized cylinder event based spark to another method of spark control. For example, time based spark control, where a timer is started after the last synchronized cylinder event based spark is delivered and then spark is delivered as a function of time. Alternatively, the routine may be designed to transition to speed/load based spark. However, care should be exercised in the transition since spark based on engine speed/load can be influenced by barometric pressure during starting because there is less oxygen at altitude than when at sea level. Once the transition to the alternate spark control method is complete, the routine is exited.

Figure 4:
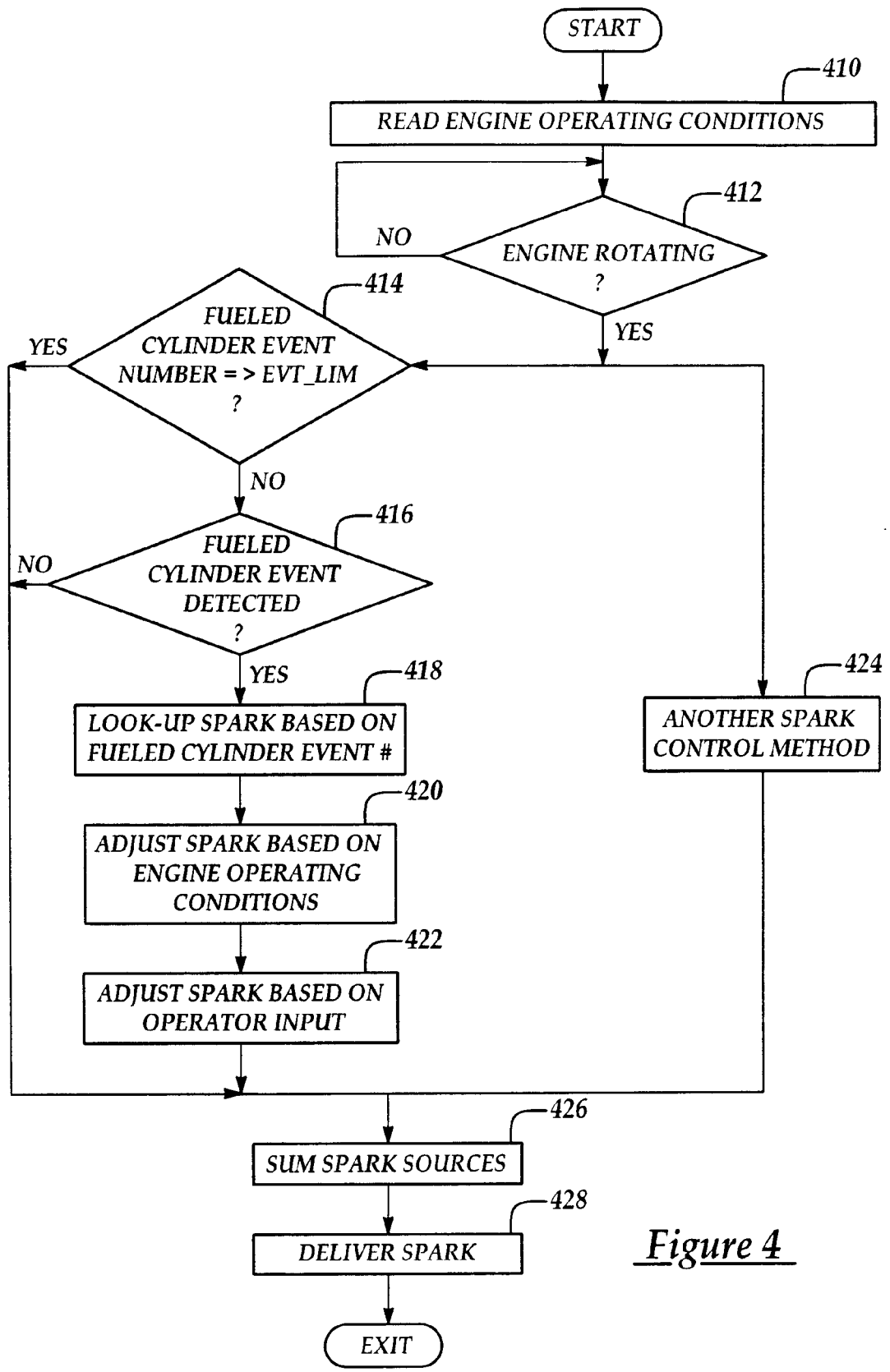
FIG. 4 is a high level flow chart of an alternate method describing fueled cylinder event based spark during a start.

Referring to FIG. 4, a flowchart of an alternate embodiment of fueled cylinder event based spark control. In step 410, engine operating conditions are read. Operating conditions are determined by measuring engine coolant temperature, engine air temperature, barometric pressure, catalyst temperature, time since engine last operated (soak time), and parameters alike. These parameters are used to compensate the engine spark angle request in steps 418 and 420. In step 412, the routine determines if the engine is rotating. If not, the routine waits until rotation is detected. If rotation is detected, the routine continues on to steps 414 and 424. The final spark demand is the sum of two operations that take separate paths in the figure.

The left path begins at step 414, where controller 12 decides to deliver spark based on fueled cylinder events. If the current number of fueled cylinder events is less than the calibration parameter EVT_LIM, then the routine proceeds to step 416. If the number of events is greater than or equal to EVT_LIM, the routine proceeds to step 426. In step 416, the controller determines if a fueled cylinder event has occurred. If so, the fueled cylinder event counter is incremented and the routine proceeds to step 418. If no newly fueled cylinder events have occurred, the routine retains the last fueled cylinder event spark value and proceeds to step 426.

In step 418, the desired spark request is looked-up from the table in FIG. 8, FNESPK. After the desired spark is determined, the routine advances to step 420.

In step 420, the spark may be modified depending on engine operating conditions observed in step 410. Compensation for barometric pressure is stored in a function named FNBP. Depending on where nominal barometric pressure is defined in the function, spark is advanced or retarded from that point to achieve desired emissions and engine speed run-up. The function has x dimensions of inches of Mercury and y dimensions of change (Δ) in spark, with units of angular degrees. Positive values in the function advance spark and negative values retard spark.

Compensation for air charge temperature is stored in a function named FNACT. Depending on where nominal air charge temperature is defined in the function, spark is advanced or retarded from that point to achieve desired emissions and engine speed run-up. The function has x dimensions of air charge temperature in degrees Fahrenheit and y dimensions of change (Δ) in spark, with units of angular degrees.

Compensation is also provided for catalyst temperature in function FNCAT. In general, FNCAT is calibrated to retard spark angle at lower catalyst temperatures and advances spark angle at higher catalyst temperatures. Catalyst temperature maybe measured or inferred. The function has x dimensions of degrees Fahrenheit and y dimensions of change (Δ) in spark, with units of angular degrees. Compensation for soak time is captured in function FNST. In general, FNST is calibrated to retard spark as soak time increases and advance spark as soak time increases. The function has x dimensions of soak time in seconds and y dimensions of change (Δ) in spark, with units of angular degrees.

All sources of spark compensation are combined into a single change in spark that is used to modify the spark angle from step 418. The routine then proceeds to step 422 where compensation for operator input is provided. Operator input may take a number of forms including; changing throttle position, load request via electronic throttle or electronically controlled valves, torque request, air conditioning, or any device or system that increases load on the engine. In this example, operator input is throttle position. If the operator inputs a demand to the throttle, the throttle signal is processed through the function FNTHROTTLE. The function has x dimensions of throttle position with units of volts and y dimensions of change (Δ) in spark, with units of angular degrees. The function is calibrated to advance spark as the throttle input increases, other inputs would follow the same form, increasing user demand advances spark. If the operator input is substantially zero, or being less than a predetermined amount, the function provides no compensation for the operator input. The routine then proceeds to step 426.

The right path of the routine begins at step 424, where spark based on operating parameters is determined by any suitable method. The routine then continues on to step 426. In step 426, spark angles from steps 422 and 424 are summed together to create final spark. The structure and calibration of this routine allows spark control to be based solely on fueled cylinder event number, or an alternative method independent of fueled cylinder event number (e.g., based on time, or speed and load), or any combination of the two depending on the calibration. The routine then proceeds to step 428, where spark is delivered to the engine. After spark is delivered to the engine the routine is exited until called again.

Figure 5:
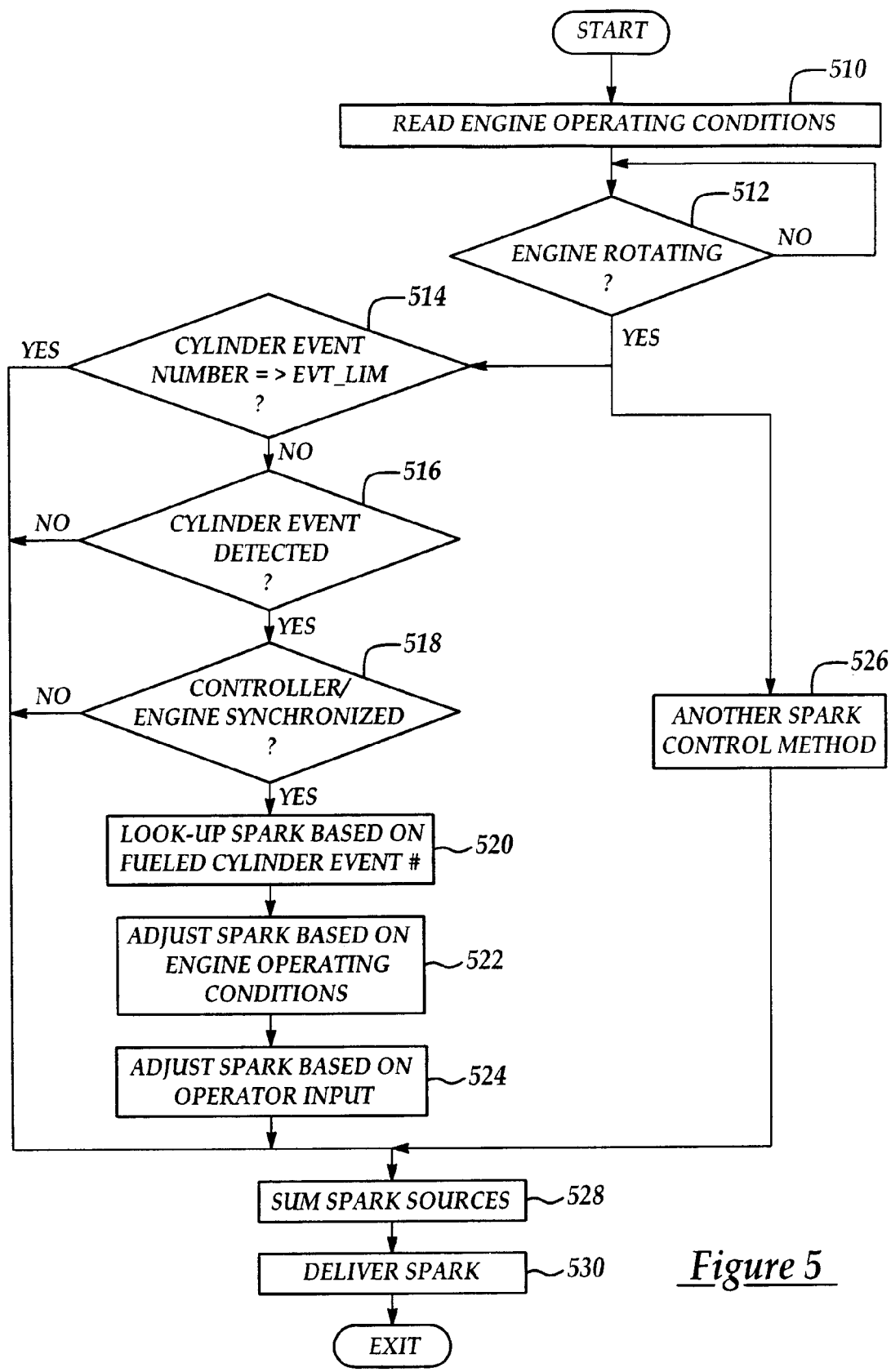
FIG. 5 is a high level flow chart of an alternate method describing synchronized cylinder event based spark during a start.

Referring to FIG. 5, a flowchart of an alternate embodiment of synchronized cylinder event based spark control. In step 510, engine operating conditions are read. Operating conditions are determined by measuring engine coolant temperature, engine air temperature, barometric pressure, catalyst temperature, time since engine last operated (soak time), and parameters alike. These parameters are used to compensate the engine spark angle request in steps 520 and 522. In step 512, the routine determines if the engine is rotating. If not, the routine waits until rotation is detected. If rotation is detected, the routine continues on to steps 514 and 526. The final spark demand is the sum of two operations that take separate paths in the figure.

The left path begins at step 514, where controller 12 decides to deliver spark based on synchronized cylinder events. If the current number of synchronized cylinder events is less than the calibration parameter EVT_LIM, then the routine proceeds to step 516. If the number of events is greater than or equal to EVT_LIM, the routine proceeds to step 528. In step 516, the controller determines if a synchronized cylinder event has occurred. If so, the synchronized cylinder event counter is incremented and the routine proceeds to step 518. If no newly synchronized cylinder events have occurred, the routine retains the last synchronized cylinder event spark value and proceeds to step 528.

Engine and controller synchronization is determined in step 518. If the controller observes cam and crank signals that allow determination of engine position, the engine controller operations and engine timing align, becoming synchronized. Upon synchronization the event counter is set to zero and the routine continues to step 520. If the engine and the controller are already synchronized, the routine again proceeds to step 520. If synchronization is not established and if synchronization cannot be established, the routine returns to step 528.

In step 520, the desired spark request is looked-up from a table similar to the table in FIG. 8, FNESPK. However, spark values used in step 520 are based on cylinder events after synchronization instead of fueled cylinder events as described by FIG. 8. After the desired spark is determined, the routine advances to step 522.

In step 522, the spark may be modified depending on engine operating conditions observed in step 510. Compensation for barometric pressure is stored in a function named FNBP. Depending on where nominal barometric pressure is defined in the function, spark is advanced or retarded from that point to achieve desired emissions and engine speed run-up. The function has x dimensions of inches of Mercury and y dimensions of change ($\Delta$) in spark, with units of angular degrees. Positive values in the function advance spark and negative values retard spark.

Compensation for air charge temperature is stored in a function named FNACT. Depending on where nominal air charge temperature is defined in the function, spark is advanced or retarded from that point to achieve desired emissions and engine speed run-up. The function has x dimensions of air charge temperature in degrees Fahrenheit and y dimensions of change ($\Delta$) in spark, with units of angular degrees.

Compensation is also provided for catalyst temperature in function FNCAT. In general, FNCAT is calibrated to retard spark angle at lower catalyst temperatures and advances spark angle at higher catalyst temperatures. Catalyst temperature maybe measured or inferred. The function has x dimensions of degrees Fahrenheit and y dimensions of change ($\Delta$) in spark, with units of angular degrees. Compensation for soak time is captured in function FNST. In general, FNST is calibrated to retard spark as soak time increases and advance spark as soak time increases. The function has x dimensions of soak time in seconds and y dimensions of change ($\Delta$) in spark, with units of angular degrees.

All sources of spark compensation are combined into a single change in spark that is used to modify the spark angle from step 520. The routine then proceeds to step 524 where compensation for operator input is provided. Operator input may take a number of forms including; changing throttle position, load request via electronic throttle or electronically controlled valves, torque request, air conditioning, or any device or system that increases load on the engine. In this example, operator input is throttle position. If the operator inputs a demand to the throttle, the throttle signal is processed through the function FNTHROTTLE. The function has x dimensions of throttle position with units of volts and y dimensions of change ($\Delta$) in spark, with units of angular degrees. The function is calibrated to advance spark as the throttle input increases, other inputs would follow the same form, increasing user demand advances spark. If the operator input is substantially zero, or being less than a predetermined amount, the function provides no compensation for the operator input. The routine then proceeds to step 528.

The right path of the routine begins at step 526, where spark based on operating parameters is determined by any suitable method. The routine then continues on to step 528. In step 528, spark angles from steps 524 and 526 are summed together to create final spark. The structure and calibration of this routine allows spark control to be based solely on synchronized cylinder event number, or an alternative method independent of synchronized cylinder event number (e.g., based on time, or speed and load), or any combination of the two depending on the calibration. The routine then proceeds to step 530, where spark is delivered to the engine. After spark is delivered to the engine the routine is exited until called again.

Figure 6:
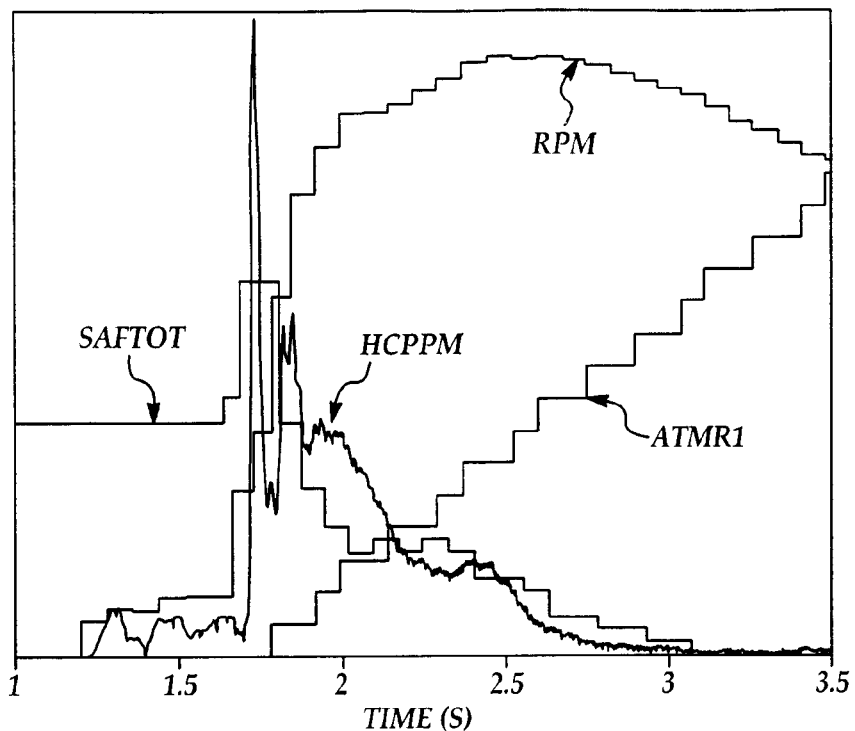
FIG. 6 is a plot showing an example of conventional time based spark and the hydrocarbon emissions produced during a start.
Figure 7:
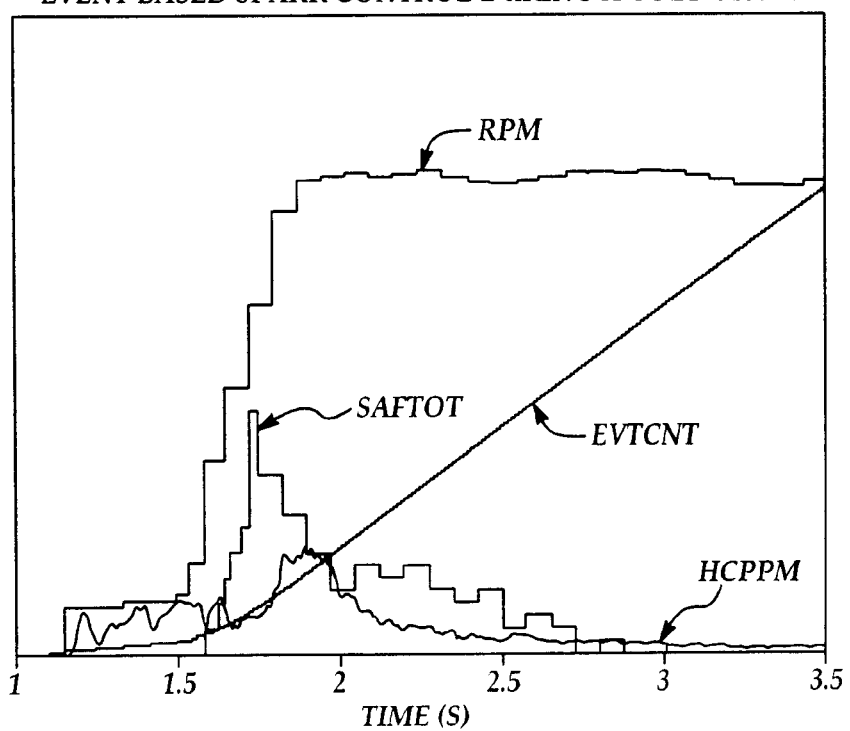
FIG. 7 is a plot showing fueled cylinder event based spark and the hydrocarbon emissions produced during a start.

Referring to FIG. 6, a plot showing parameters of interest during a start where conventional time based spark is used. Signal magnitudes have been normalized so that the trajectories can be viewed together. FIGS. 6 and 7 are scaled equally to allow objective comparison of the two methods.

Engine speed (RPM), Hydrocarbons (HCPPM), time since start (ATMR1), and spark (SAF) are plotted to show typical signal trajectories during a cold start. Notice the relationship between the signals. Spark is held constant until a predetermined engine speed is observed, then it follows a trajectory described by a table or function. The delivered spark is not correlated to cylinder events. The approach results in higher hydrocarbon emissions since individual events are not controlled. Note that signal ATMR1 increases linearly and is independent of engine speed or number of fueled or unfueled cylinder events.

Referring to FIG. 7, a plot showing the same parameters as FIG. 6, but where fueled cylinder event based spark is used according to one embodiment of the present invention. Signal magnitudes have been normalized so that the trajectories of signals can be viewed together.

Engine speed (RPM), hydrocarbons (HCPPM), number of fueled cylinder events (EVTCNT), and spark (SAFTOT) are plotted to show typical signal trajectories during a start. Notice the relationship between the signals, spark is allowed to change based on fueled cylinder event number. The spark follows a trajectory described by a table FNESPK. The delivered spark is linked to a specific synchronized cylinder event which results in reduced HC emissions while producing sufficient torque to run the engine speed up to idle.

Referring to FIG. 8, a table FNESPK, showing example spark desired based on engine coolant temperature and fueled cylinder event number. The table is used to determine the spark to be delivered to a specific fueled cylinder event. The table has x dimensions of engine temperature, in degrees Fahrenheit, and y dimensions of fueled cylinder event number. Typically, table columns and rows are defined by the resolution needed to support the combustion process. In general, enough rows are provided to control individual cylinder events over the first two engine cycles, plus a few additional rows. The additional rows are used to define spark over a number of fueled cylinder events, reflecting stabilization in the combustion process as the number of fueled cylinder events increases. Negative values in the table refer to ignition angles after-top-dead-center of the compression stroke, while positive values refer to angles before-top-dead center of compression of the compression stroke.

Regarding, the shape of the columns, spark is delivered at a constant engine temperature over a number of cylinder events. A retarded spark angle is requested in the first two rows, and then the spark angle increases. This spark profile recognizes the changing requirements of spark during a start. The first two cylinder events can tolerate more spark retard because the cylinder charge is nearly free of residual gasses. The next few events request increased spark, to support engine speed run-up and combustion as residuals increase.

Figure 9:
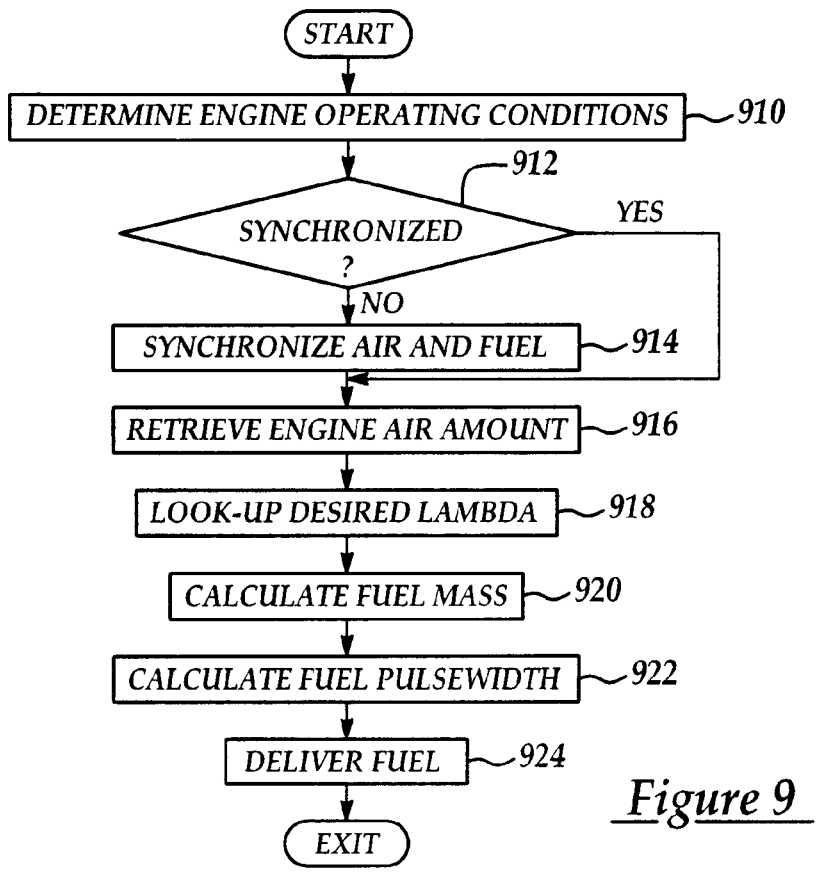
FIG. 9 is a high level flow chart describing sequential fuel control (SEFI)

Referring to FIG. 9, a flowchart of a routine performed by controller 12 to control fueling based on a sequential strategy is shown. Sequential fueling strategies deliver unique fuel amounts to each cylinder based on the corresponding air charge of the cylinder. Fuel may be delivered on a open or close intake valves. By matching individual fuel amounts with individual air amounts, sequential fueling strategies offer the opportunity to improve emissions. Additional emissions reductions can be achieved by matching spark to individual cylinder events. Sequential fuel is delivered after the engine and controller 12 are synchronized. In step 910, engine operating conditions are read. Operating conditions are determined by measuring engine coolant temperature and parameters alike. These parameters are used to compensate engine fuel amount estimates in step 918. In step 912, the routine decides whether to synchronize air and fuel delivery, step 914, or to proceed and retrieve the engine air amount in step 916. If the air and fuel have not been synchronized, the controller 12 aligns the two-event predicted engine air amount with the next cylinder on intake stroke. In step 716, the engine air amount is retrieved from an engine air amount estimation routine. In step 718, the desired Lambda is retrieved from predetermined values stored in a table. The table has x dimension units of engine coolant temperature (ECT) and y dimension units of time since start. Lambda is calculated as follows:

$$Lambda(\lambda) = \frac{\frac{Air}{Fuel}}{\frac{Air}{Fuel_{stoichiometry}}}$$

In step 920, fuel mass is calculated based on the engine air amount from step 916, and the Lambda value retrieved in step 918. Fuel mass is calculated as follows:

$$Fuel\_Mass = \frac{Engine\_Air\_Amount}{\frac{Air}{Fuel_{stoichiometry}} \cdot Lambda}$$

In step 922, injector pulse width is calculated using a function whose input is desired fuel mass and whose output is injector pulse width. In step 924, the injectors are activated for the duration determined in step 922. This process occurs for every injection event, using cylinder specific air amounts, producing cylinder specific fueling.

Figure 10:
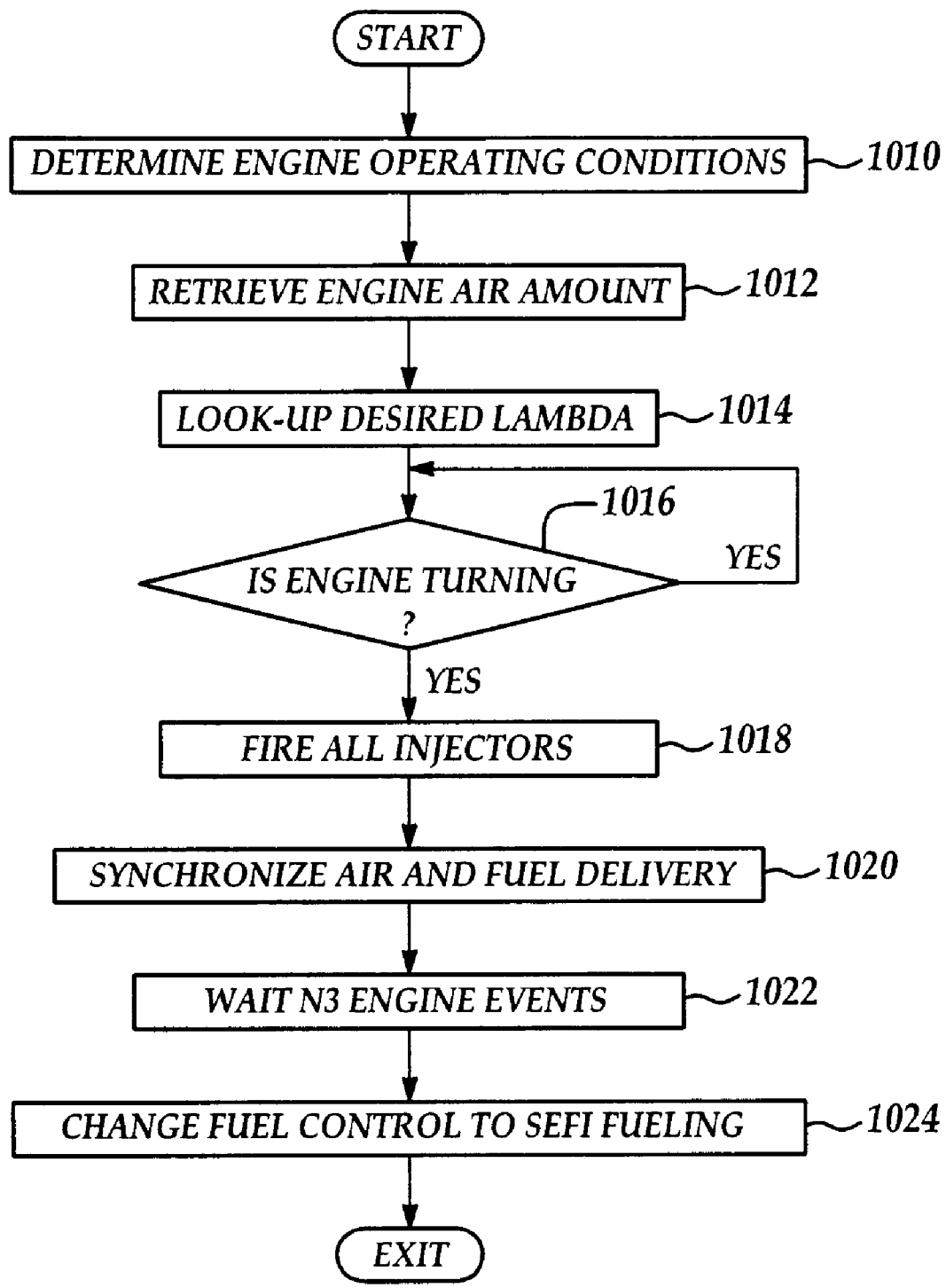
FIG. 10 is a high level flow chart describing Big-Bang fueling.

Referring to FIG. 10, a flowchart of a routine performed by controller 12 to provide Big-Bang fueling. Big-Bang fueling decreases the time to start since engine synchronization is not required. Optimal emissions are not achieved using Big-bang fueling, but emissions can be reduced while decreasing starting time when cylinder event based spark is performed with Big-bang fueling. Emissions reductions are a result of matching spark with cylinders that have received the complete injection amount. In step 1010 engine operating conditions are read. Operating conditions are determined by measuring engine coolant temperature and parameters alike. These parameters are used to compensate engine fuel amount estimates in step 1014. In step 1012, engine air amount is retrieved from calculations made in step 1012. In step 1014, the desired Lambda is looked-up using the same method used in step 1018. In step 1016, the routine determines if the engine is rotating. If so, all injectors are fired simultaneously in step 1018, where the first cylinder event is detected. If the engine is not rotating, fuel is not delivered and the routine waits until rotation is detected. In step 1020, the engine controller 12 determines engine position using signals provided by crankshaft 118 and camshaft 150 sensors. Once engine position is determined, predicted engine air amount and fuel delivery are aligned. Big Bang fueling provides fuel for two engine revolutions allowing the controller 12 to wait N3 cylinder events, step 1022, before beginning SEFI fueling, step 1024. Note that N3 is the number of cylinders in the engine.

As will be appreciated by one of ordinary skill in the art, the routines described in FIGS. 2, 3, 7, and 8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

This concludes the description of the invention. The reading of it by those skilled in the art would bring to mind many alterations and modifications without departing from the spirit and the scope of the invention. For example, I3, I4, I5, V6, V8, V10, and V12 engines operating in natural gas, gasoline, or alternative fuel configurations could use the present invention to advantage. Accordingly, it is intended that the scope of the invention be defined by the following claims:

What is claimed is:

1. A spark ignition controlling method for an internal combustion engine of a vehicle, comprising:

counting a number of cylinders receiving at least one fuel injection from a start of the internal combustion engine; and adjusting cylinder spark angle based on said counted number of cylinders.

2. The method as set forth in claim 1 wherein said cylinder spark angle is adjusted in accordance with an increase in the number of fuel injections.

3. The method as set forth in claim 1 wherein said cylinder spark angle is further adjusted based on ambient air temperature and engine temperature.

4. The method as set forth in claim 1 wherein said cylinder spark angle is further adjusted based on barometric pressure.

5. The method as set forth in claim 1 wherein said cylinder spark angle is further adjusted based on catalyst temperature.

6. The method as set forth in claim 1 wherein said cylinder spark angle is further adjusted based on a duration since said internal combustion engine last operated.

7. The method as set forth in claim 1 wherein said cylinder spark angle is further adjusted based on air injected into the exhaust system.

8. The method as set forth in claim 1 wherein said fuel injection is asynchronous of engine timing at least once during said start; and injecting fuel synchronous to said engine timing after said start.

9. The method as set forth in claim 8 wherein said fuel injected produces a lean air-fuel mixture during said start.

10. The method as set forth in claim 1 wherein said cylinder spark angle is further adjusted based on operator input.

11. The method as set forth in claim 10 wherein said operator input request is an operator opening a mechanical throttle body.

12. The method as set forth in claim 10 wherein said operator input request is made by the operator acting on a device of the vehicle.

13. A spark ignition controlling method for an internal combustion engine, comprising:

counting a number of cylinders receiving at least one fuel injection from a start of the internal combustion engine;

adjusting a first amount of said cylinder spark angle based on said counted number of cylinders;

adjusting a second amount of said cylinder spark angle independent of said counted number of cylinders; and delivering spark to the engine based on said first and second amount.

14. A spark ignition controlling method for an internal combustion engine, comprising:

injecting fuel quantities synchronous to engine valve timing;

counting a number of cylinders receiving at least one of said synchronous injected fuel quantities from a start of the internal combustion engine; and adjusting cylinder spark angle based on said counted number of cylinders.

15. The method as set forth in claim 14 wherein said injected fuel produces a lean air-fuel mixture during said engine warm-up.

16. A spark ignition controlling method for an internal combustion engine of a vehicle, comprising:

counting a number of cylinders receiving at least one fuel injection from a start of the internal combustion engine; and adjusting cylinder spark angle based on said counted number of cylinders while operator input is substantially zero.

17. The method as set forth in claim 16 wherein said operator input request is an operator opening a mechanical throttle body.

18. The method as set forth in claim 16 wherein said operator input request is made by the operator acting on a device of the vehicle.

19. A computer readable storage medium having stored data representing instructions executable by a computer to control a spark ignition internal combustion engine of a vehicle, said storage medium comprising:

instructions for counting a number of cylinders receiving at least one fuel injection from a start of the internal combustion engine; and instructions for adjusting cylinder spark angle based on said counted number of cylinders.

* * * * *